US008824459B2

(12) United States Patent
Lu et al.

(10) Patent No.: US 8,824,459 B2
(45) Date of Patent: Sep. 2, 2014

(54) METHODS AND APPARATUS TO MEASURE MARKET SHARE FOR VOICE OVER INTERNET PROTOCOL CARRIERS

(75) Inventors: Shi Lu, San Ramon, CA (US); Jerome Baccelli, Berkeley, CA (US)

(73) Assignee: The Nielsen Company, (US) LLC, Schaumburg, IL (US)

(*) Notice: Subject to any disclaimer, the term of this patent is extended or adjusted under 35 U.S.C. 154(b) by 56 days.

(21) Appl. No.: 13/616,650

(22) Filed: Sep. 14, 2012

(65) Prior Publication Data

US 2013/0064242 A1 Mar. 14, 2013

Related U.S. Application Data

(63) Continuation of application No. 12/243,633, filed on Oct. 1, 2008, now Pat. No. 8,279,852.

(51) Int. Cl.
*H04L 12/66* (2006.01)

(52) U.S. Cl.
USPC .......................................................... 370/352

(58) Field of Classification Search
CPC .............. H04L 12/66; H04L 29/06176; H04L 29/06326; H04L 29/06; H04L 61/1529; H04M 7/0081
See application file for complete search history.

(56) References Cited

U.S. PATENT DOCUMENTS

| 5,661,792 A | 8/1997 | Akinpelu et al. |
| 5,822,410 A | 10/1998 | McCausland et al. |
| 5,903,625 A | 5/1999 | May |
| 6,006,085 A | 12/1999 | Balachandran |
| 6,028,914 A | 2/2000 | Lin et al. |
| 6,049,599 A | 4/2000 | McCausland et al. |
| 6,169,793 B1 | 1/2001 | Godwin et al. |
| 6,169,896 B1 | 1/2001 | Sant et al. |

(Continued)

FOREIGN PATENT DOCUMENTS

| EP | 1309207 | 5/2003 |
| WO | 9818270 | 4/1998 |

(Continued)

OTHER PUBLICATIONS

United States Patent and Trademark Office, "Notice of Allowance," issued in connection with U.S. Appl. No. 12/406,538, mailed Oct. 3, 2012, 17 pages.

(Continued)

*Primary Examiner* — Yong Zhou
(74) *Attorney, Agent, or Firm* — Hanley, Flight & Zimmerman, LLC

(57) ABSTRACT

Methods and apparatus to measure market share for VoIP carriers is disclosed. An example method includes querying a plurality of VoIP carrier servers to determine the VoIP carrier server that owns the telephone subscriber number (SN), in response to the querying, receiving a plurality of messages operable to determine whether the telephone SN is found within any one of the plurality of VoIP carrier servers, when the received plurality of messages is at least one of inconclusive or when the telephone SN is not found within any one of the plurality of VoIP carrier servers, placing a first partial call to the telephone SN from a first VoIP number within a first VoIP carrier network, receiving a first signal from the first VoIP carrier network, and based on the first received signal, determining whether the telephone SN belongs to the first VoIP carrier network.

21 Claims, 5 Drawing Sheets

(56) References Cited

U.S. PATENT DOCUMENTS

| | | | |
|---|---|---|---|
| 6,178,451 B1 | 1/2001 | Huitema et al. | |
| 6,192,115 B1 | 2/2001 | Toy et al. | |
| 6,298,352 B1 | 10/2001 | Kannan et al. | |
| 6,301,471 B1 | 10/2001 | Dahm et al. | |
| 6,411,807 B1 | 6/2002 | Amin et al. | |
| 6,487,390 B1 | 11/2002 | Virine et al. | |
| 6,516,189 B1 | 2/2003 | Frangione et al. | |
| 6,556,992 B1 | 4/2003 | Barney et al. | |
| 6,597,903 B1 | 7/2003 | Dahm et al. | |
| 6,618,587 B1 | 9/2003 | Ghafoor | |
| 6,625,269 B1 | 9/2003 | Kim | |
| 6,636,868 B1 | 10/2003 | Bauer et al. | |
| 6,697,469 B1 | 2/2004 | Koster | |
| 6,751,295 B2 | 6/2004 | McCulley et al. | |
| 6,754,470 B2 | 6/2004 | Hendrickson et al. | |
| 6,775,262 B1 | 8/2004 | Skog et al. | |
| 6,788,926 B1 | 9/2004 | Frangione et al. | |
| 6,832,211 B1 | 12/2004 | Thomas et al. | |
| 7,003,306 B2 | 2/2006 | Henry-Labordere | |
| 7,058,412 B2 | 6/2006 | Lowe et al. | |
| 7,133,916 B2 | 11/2006 | Schunemann | |
| 7,139,246 B2 | 11/2006 | Harris et al. | |
| 7,190,969 B1 | 3/2007 | Oh et al. | |
| 7,248,862 B2 | 7/2007 | Minborg et al. | |
| 7,366,515 B2 | 4/2008 | Zhao et al. | |
| 7,369,865 B2 | 5/2008 | Gabriel et al. | |
| 7,599,681 B2 | 10/2009 | Link, II et al. | |
| 7,761,088 B1 | 7/2010 | Hannan et al. | |
| 7,933,392 B1 | 4/2011 | Hannan et al. | |
| 8,031,856 B2 | 10/2011 | Mikleton et al. | |
| 8,279,852 B2 | 10/2012 | Lu et al. | |
| 8,369,826 B2 | 2/2013 | Alla | |
| 2002/0016731 A1 | 2/2002 | Kupersmit | |
| 2002/0023003 A1 | 2/2002 | Raheman | |
| 2002/0069037 A1 | 6/2002 | Hendrickson et al. | |
| 2002/0086671 A1 | 7/2002 | Amin et al. | |
| 2002/0111809 A1 | 8/2002 | McIntosh | |
| 2003/0023571 A1 | 1/2003 | Barnhill | |
| 2003/0061152 A1 | 3/2003 | De et al. | |
| 2003/0064722 A1 | 4/2003 | Frangione et al. | |
| 2003/0088491 A1 | 5/2003 | Liu et al. | |
| 2003/0190015 A1 | 10/2003 | McCulley et al. | |
| 2003/0200135 A1 | 10/2003 | Wright | |
| 2003/0229534 A1 | 12/2003 | Frangione et al. | |
| 2003/0236694 A1 | 12/2003 | Liu et al. | |
| 2004/0097245 A1 | 5/2004 | Sheth et al. | |
| 2005/0043011 A1 | 2/2005 | Murray et al. | |
| 2005/0111640 A1 | 5/2005 | Moisey et al. | |
| 2005/0271029 A1* | 12/2005 | Iffland | 370/348 |
| 2006/0023854 A1 | 2/2006 | Moisan et al. | |
| 2006/0109846 A1 | 5/2006 | Lioy et al. | |
| 2006/0135161 A1 | 6/2006 | Jiang et al. | |
| 2007/0099635 A1 | 5/2007 | Mohanty et al. | |
| 2007/0121603 A1 | 5/2007 | Clark, III et al. | |
| 2007/0147358 A1 | 6/2007 | Mikleton et al. | |
| 2007/0156673 A1 | 7/2007 | Maga et al. | |
| 2007/0165613 A1* | 7/2007 | Soo et al. | 370/356 |
| 2007/0185867 A1 | 8/2007 | Maga et al. | |
| 2008/0176535 A1 | 7/2008 | Cai | |
| 2008/0182553 A1 | 7/2008 | Salkini et al. | |
| 2008/0228557 A1 | 9/2008 | Sepehri-Nik et al. | |
| 2010/0036809 A1 | 2/2010 | Gerster et al. | |
| 2010/0057812 A1 | 3/2010 | Moisan et al. | |
| 2010/0074431 A1 | 3/2010 | Enzmann et al. | |
| 2010/0080215 A1 | 4/2010 | Lu et al. | |
| 2010/0080369 A1 | 4/2010 | Hurst et al. | |
| 2010/0091975 A1 | 4/2010 | Sheth et al. | |
| 2010/0167689 A1 | 7/2010 | Sepehri-Nik et al. | |
| 2010/0240341 A1 | 9/2010 | Alla | |
| 2011/0038468 A1 | 2/2011 | Hannan et al. | |
| 2011/0158171 A1 | 6/2011 | Centonza et al. | |
| 2011/0276366 A1 | 11/2011 | Goyet et al. | |
| 2012/0084430 A1 | 4/2012 | Lu | |

FOREIGN PATENT DOCUMENTS

| | | |
|---|---|---|
| WO | 0039981 | 7/2000 |
| WO | 0056098 | 9/2000 |
| WO | 0219625 | 3/2002 |
| WO | 02071674 | 9/2002 |
| WO | 2007081424 | 7/2007 |
| WO | 2008112352 | 9/2008 |

OTHER PUBLICATIONS

United States Patent and Trademark Office, "Final Office Action," issued in connection with U.S. Appl. No. 12/406,538, mailed Jun. 19, 2012, 18 pages.

United States Patent and Trademark Office, "Non-Final Office Action," issued in connection with U.S. Appl. No. 12/406,538, mailed Sep. 12, 2011, 51 pages.

State Intellectual Property Office of P.R. China, "First Office Action," issued in connection with Chinese application serial No. 201010206959.2, issued Dec. 16, 2011, 11 pages.

State Intellectual Property Office of P.R. China, "Second Office Action," issued in connection with Chinese application serial No. 201010206959.2, issued Dec. 4, 2012, 10 pages.

State Intellectual Property Office of P.R. China, "First Office Action," issued in connection with Chinese application serial No. 03812238.3, issued Jan. 18, 2008, 11 pages.

State Intellectual Property Office of P.R. China, "Second Office Action," issued in connection with Chinese application serial No. 03812238.3, issued May 22, 2009, 5 pages.

State Intellectual Property Office of P.R. China, "Notification of Grant," issued in connection with Chinese application serial No. 03812238.3, issued Mar. 24, 2010, 2 pages.

European Patent Office, "Office Communication," issued in connection with European application serial No. 03 719 560.9, issued Oct. 8, 2009, 3 pages.

European Patent Office, "Office Communication," issued in connection with European application serial No. 03 719 560.9, issued Sep. 8, 2010, 6 pages.

Canadian Intellectual Property Office, "Office Action," issued in connection with Canadian application serial No. 2,481,203, issued Dec. 4, 2007, 3 pages.

Canadian Intellectual Property Office, "Notice of Allowance," issued in connection with Canadian application serial No. 2,481,203, issued Jun. 5, 2009, 1 page.

Korean Intellectual Property Office, "Non-Final Rejection," issued in connection with Korean application serial No. 10-2004-7015715, issued Nov. 10, 2009, 8 pages.

Korean Intellectual Property Office, "Final Rejection," issued in connection with Korean application serial No. 10-2004-7015715, issued Apr. 12, 2010, 6 pages.

Japaense Patent Office, "Office Action," issued in connection with Japanese application serial No. 2003-583001, issued Sep. 30, 2008, 4 pages.

United States Patent and Trademark Office, "Non-Final Office Action," issued in connection with U.S. Appl. No. 10/263,782, mailed May 21, 2003, 10 pages.

State Intellectual Property Office of P.R. China, "First Office Action," issued in connection with Chinese application serial No. 01816436.6, issued Dec. 9, 2005, 6 pages.

International Searching Authority, "International Search Report," issued in connection with application serial No. PCT/US03/18070, issued Aug. 29, 2003, 5 pages.

"Call Delivery," retrieved from www.members.tripod.com/-peacecraft/infomining/cellphon.htm, Feb. 1, 2006, 1 page.

Galaxy Phones, Mobile Phones-The Basics, retrieved from www.galaxyphones.co.uk/mobile_phones_basics07.asp, May 9, 2006, 4 pages.

NPA-NXX, "North American Numbering Plan," retrived from www.voip-info.org/wiki-NPA-NXX, May 12, 2008, 3 pages.

IEEE Xplore, "A System for Basic-Level Network Fault Management Based on the GSMshort message service SMS," search, copyright 2009, 1 page.

(56) References Cited

OTHER PUBLICATIONS

"Telephia Acquires Mspect, Adding SMS Monitoring to Its Wireless Data QoS Solution," Business Wire, Nov. 13, 2001, 2 pages.
Wikipedia, "Network Switiching Subsystem," retirved from Wikipedia on Mar. 2, 2006, 6 pages.
United States Patent and Trademark Office, "Supplemental Notice of Allowance," issued in connection with U.S. Appl. No. 11/445,069, mailed Mar. 30, 2011, 4 pages.
United States Patent and Trademark Office, "Supplemental Notice of Allowance," issued in connection with U.S. Appl. No. 11/445,069, mailed Dec. 7, 2010, 4 pages.
United States Patent and Trademark Office, "Notice of Allowance," issued in connection with U.S. Appl. No. 11/445,069, mailed Oct. 19, 2010, 15 pages.
United States Patent and Trademark Office, Non-Final Office Action, issued in connection with U.S. Appl. No. 11/445,069, mailed May 10, 2010, 38 pages.
United States Patent and Trademark Office, "Notice of Allowance," issued in connection with U.S. Appl. No. 12/911,044, mailed Jan. 8, 2013, 29 pages.
United States Patent and Trademark Office, "Non-Final Office Action," issued in connection with U.S. Appl. No. 12/911,044, mailed Aug. 17, 2012, 25 pages.
United States Patent and Trademark Office, "Notice of Allowance," issued in connection with U.S. Appl. No. 11/486,498, mailed May 18, 2010, 17 pages.
United States Patent and Trademark Office, "Notice of Allowance," issued in connection with U.S. Appl. No. 11/486,498, mailed Apr. 20, 2010, 14 pages.
United States Patent and Trademark Office, "Notice of Allowance," issued in connection with U.S. Appl. No. 11/486,498, mailed Feb. 19, 2010, 8 pages.
United States Patent and Trademark Office, "Final Office Action," issued in connection with U.S. Appl. No. 11/486,498, mailed Nov. 4, 2009, 25 pages.
United States Patent and Trademark Office, "Non-Final Office Action," issued in connection with U.S. Appl. No. 11/486,498, mailed Apr. 3, 2009, 13 pages.
United States Patent and Trademark Office, "Notice of Abandonment," issued in connection with U.S. Appl. No. 11/527,219, mailed Jan. 8, 2010, 2 pages.
United States Patent and Trademark Office, "Final Office Action," issued in connection with U.S. Appl. No. 11/527,219, mailed Jun. 24, 2009, 25 pages.
United States Patent and Trademark Office, "Non-Final Office Action," issued in connection with U.S. Appl. No. 11/527,219, mailed Dec. 5, 2008, 11 pages.
European Patent Office, "Office Communication," issued in connection with European application serial No. 09012467.8, issued Oct. 27, 2010, 1 page.
European Patent Office, "Search Report," issued in connection with European application serial No. 09012467.8, issued Mar. 23, 2010, 7 pages.
United States Patent and Trademark Office, "Notice of Allowance," issued in connection with U.S. Appl. No. 12/243,633, mailed May 29, 2012, 19 pages.
United States Patent and Trademark Office, "Non-Final Office Action," issued in connection with U.S. Appl. No. 12/243,633, mailed Dec. 6, 2011, 45 pages.
European Patent Office, "Search Report," issued in connection with European application serial No. 09012468.6, issued Jan. 26, 2010, 6 pages.
European Patent Office, "Office Communication," issued in connection with European application serial No. 09012468.6, issued Nov. 8, 2010, 1 pages.
United States Patent and Trademark Office, "Non-Final Office Action," issued in connection with U.S. Appl. No. 12/243,699, mailed Nov. 23, 2012, 57 pages.
United States Patent and Trademark Office, "Restriction Requirement," issued in connection with U.S. Appl. No. 12/243,699, mailed Jun. 21, 2012, 4 pages.
United States Patent and Trademark Office, "Non-Final Office Action," issued in connection with U.S. Appl. No. 13/407,523, mailed Dec. 3, 2012, 26 pages.
United States Patent and Trademark Office, "Decision on Appeal," issued in connection with U.S. Appl. No. 10/237,478, mailed Dec. 7, 2012, 7 pages.
United States Patent and Trademark Office, "Examiner's Answer," issued in connection with U.S. Appl. No. 10/237,478, mailed Dec. 23, 2010, 17 pages.
United States Patent and Trademark Office, "Final Office Action," issued in connection with U.S. Appl. No. 10/237,478, mailed Oct. 2, 2009, 37 pages.
United States Patent and Trademark Office, "Non-Final Office Action," issued in connection with U.S. Appl. No. 10/237,478, mailed Feb. 17, 2009, 25 pages.
United States Patent and Trademark Office, "Advisory Action," issued in connection with U.S. Appl. No. 10/237,478, mailed Nov. 14, 2008, 3 pages.
United States Patent and Trademark Office, "Final Office Action," issued in connection with U.S. Appl. No. 10/237,478, mailed Sep. 12, 2008, 24 pages.
United States Patent and Trademark Office, "Non-Final Office Action," issued in connection with U.S. Appl. No. 10/237,478, mailed Jan. 4, 2008, 18 pages.
United States Patent and Trademark Office, "Restriction Requirement," issued in connection with U.S. Appl. No. 10/237,478, mailed Apr. 19, 2007, 9 pages.
Palm Inc., SMS Handbook, 2001, 24 pages.
Qualcom, "Handling SMS in BREW," Document ID: 52, retrieved from www.qualcomm.com on Aug. 30, 2007, 3 pages.
Criterion Wireless, "Competitive Marketing Intelligence," retrieved from www.criterionwireless.com, on Dec. 28, 2007, 2 pages.

* cited by examiner

300

METHODS AND APPARATUS TO MEASURE MARKET SHARE FOR VOICE OVER INTERNET PROTOCOL CARRIERS

CROSS REFERENCE TO RELATED APPLICATION

This patent is a continuation and claims priority to U.S. application Ser. No. 12/243,633, filed Oct. 1, 2008, entitled "Method and System for Measuring Market Share for Voice Over Internet Protocol Carriers," which is hereby incorporated herein by reference in its entirety.

TECHNICAL FIELD

The examples described herein relate to the field of communication systems and, more particularly, to a method and apparatus to measure market share for voice over Internet protocol carriers.

BACKGROUND

The prevalence of electronic devices has increased the need for connectivity. For example, most electronic devices include wireless component landline, cable and Internet capabilities to enable connectivity via technologies and/or protocols such as Bluetooth, session initiation protocol (SIP), Voice over Internet protocol (VoIP), etc. Many carriers have emerged to facilitate connectivity via the Internet, Bluetooth, landline connection, SIP, VoIP and the like.

VoIP technology has become a growing segment of technology in the past few years. The emergence of VoIP carriers has led to competition between VoIP carriers. As a result, the need for measuring competitive performance has increased to enable VoIP carriers to improve their services, increase their market share and become more competitive in the market. For example, measuring competitive performance such as monitoring market share of various VoIP carriers over a period of time in a given geographical area may enable VoIP carriers to launch efficient marketing campaigns, to efficiently plan capital investments and the like.

In other words, measuring competitive performance such as the market share of VoIP carriers may be used to better understand the structure of their respective markets. Understanding competitive performance has become an integral part of virtually every business structure, enabling businesses to modify their products and services to achieve highest possible efficiency and to become more competitive given their resources. Understanding competitive performance of VoIP carriers has become even more important given the recent explosion of the number of VoIP carriers in recent years.

To measure competitive performance such as market share, most VoIP carriers have relied on surveys. Typically, a surveyor places a call and gathers data from customers directly. Other methods for measuring market share information include gathering information through online surveys (e.g., e-mailing surveys or survey through a website). Thus, surveying customers to measure a market share of a VoIP carrier requires a subscriber's participation.

Unfortunately, the manual process of surveying customers to measure market share of VoIP carriers is inaccurate, time consuming and expensive. For example, customers may often be confused about the identity of the VoIP carrier they use for a particular communication service and, as a result, may provide the wrong information. Furthermore, manual surveying is prone to non-response from customers, thereby presenting difficulties in making the response data representative of the population surveyed.

Still further, a manual survey process is expensive to implement. For example, manual surveying requires significant cost to reach a sample size that provides statistically significant and/or accurate information. Moreover, manual surveying does not enable VoIP carriers to economically determine the number of added subscribers or lost subscribers. In other words, manual surveying fails to provide real-time transparency of the market share of a VoIP carrier, the number of added subscribers or the number of lost subscribers.

DETAILED DESCRIPTION

Figure 1:
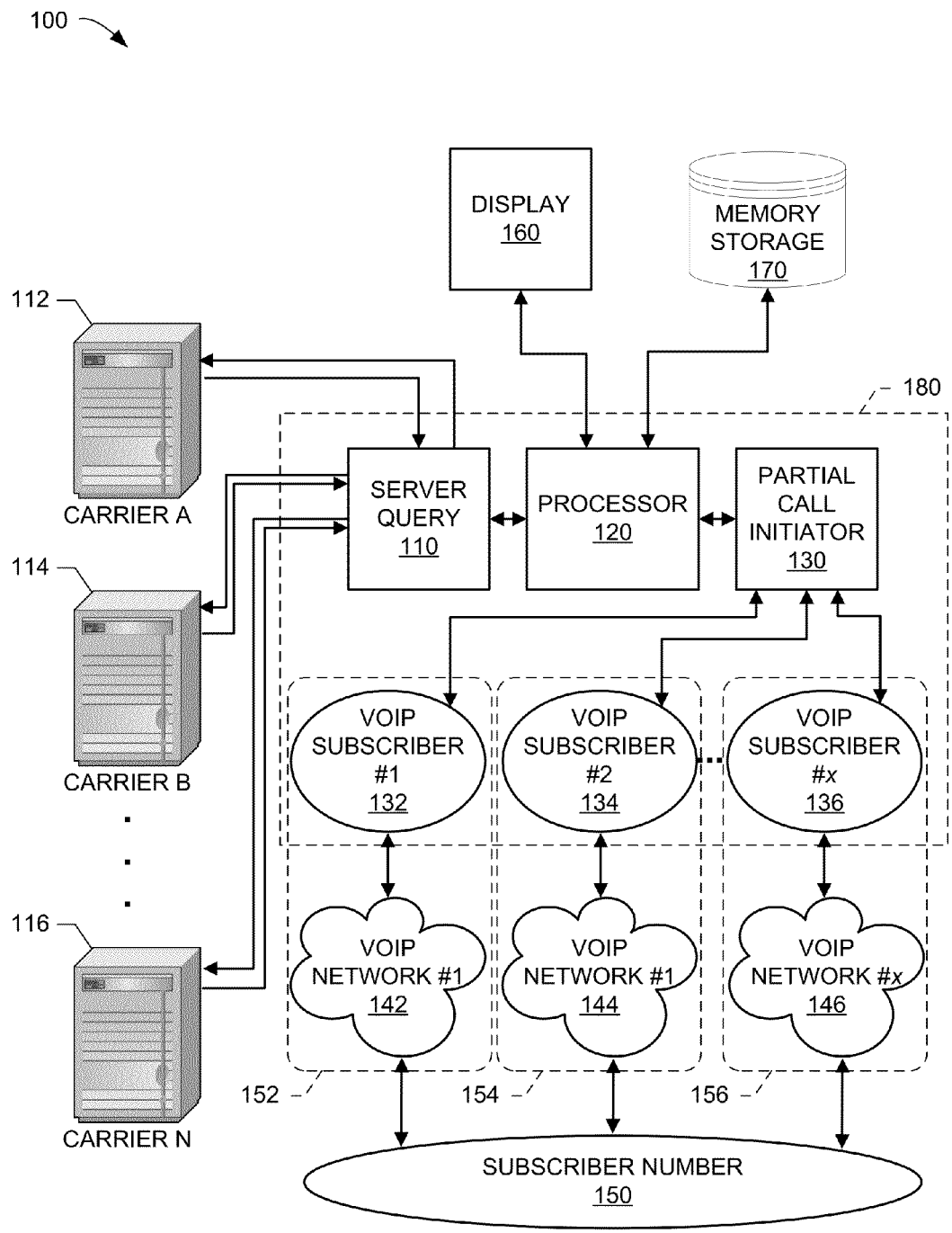
FIG. 1 depicts an example system to measure market share of VoIP carriers.

Determining which VoIP carrier a given telephone number belongs to is typically a complex process. Traditionally, the mapping of telephone number blocks with the carriers that own them may be found in publicly accessible and regularly maintained databases, such as the LERG (Local Exchange Routing Guide) in the US. Unfortunately VoIP carriers rarely or never appear in such databases, because VoIP carriers typically buy blocks of telephone numbers from established carriers without updating the public databases, such as the LERG database. Such circumstances frustrate efforts by one or more third party entities, such as one or more market research companies, to know which blocks of telephone numbers are owned by which VoIP carrier(s).

The examples described herein may be used to measure market share of VoIP carriers in an accurate and cost effective manner. In particular, the examples described herein may be advantageously used to measure market share of VoIP carriers through an automated process, thereby eliminating active participation of subscribers.

In one example, a collection of VoIP subscriber numbers are selected to form a sample of all VoIP subscriber numbers. The ownership of a VoIP subscriber number is determined to further determine market share of VoIP carriers. Servers belonging to one or more VoIP carriers may be queried to determine whether the VoIP subscriber number is found in a given server. Thus, when the VoIP subscriber number is found in a VoIP server, the VoIP subscriber number is determined to belong to the VoIP carrier that corresponds to the VoIP subscriber number. If the VoIP subscriber number is not found in a predetermined number of VoIP carrier servers or if the received message from the servers is inconclusive, a partial call may be placed to the VoIP subscriber number from a first VoIP subscriber number within a first VoIP carrier network. A signal may be received as a result of the partial call. Based on the received signal, it may be determined whether the VoIP subscriber number belongs to the first VoIP carrier network. For example, the response time and/or parameters of the received VoIP signaling messages may be used to determine whether the VoIP subscriber number belongs to the first VoIP carrier network. If the VoIP subscriber number does not belong to the first VoIP carrier network, a partial call is placed from a second VoIP subscriber number within a second VoIP carrier network to the VoIP subscriber number. Similarly, it may be determined whether the VoIP subscriber number belongs to the second VoIP carrier network. The foregoing process may be repeated until the VoIP carrier that owns the VoIP subscriber number can be determined Alternatively, the process may be repeated until the number of interested predetermined VoIP carriers is exhausted. Subsequently, the VoIP subscriber number may be categorized in VoIP carrier category "others."

As a result, the ownership of VoIP subscriber numbers may be determined. A sample size to provide statistically accurate market share information for various VoIP subscriber numbers is determined. Thus, using the foregoing example teachings, the market share of VoIP carriers may be determined in an automated, accurate and cost efficient manner.

One described example pertains to a method of determining the ownership of a Voice over Internet Protocol (VoIP) subscriber number including querying a plurality of VoIP carrier servers to determine the VoIP carrier server that owns the VoIP subscriber number; in response to the querying, receiving a plurality of messages operable to determine whether the VoIP subscriber number is found within any one of the plurality of VoIP carrier servers; when the received plurality of messages is inconclusive or when the VoIP subscriber number is not found within any one of the plurality of VoIP carrier servers, placing a first partial call to the VoIP subscriber number from a first VoIP number within a first VoIP carrier network; in response to the placing the first partial call, receiving a first signal from the first VoIP carrier network; and based on the first received signal, determining whether the VoIP subscriber number belongs to the first VoIP carrier network.

Another described example includes terminating the query of the plurality of VoIP carrier servers when ownership of the VoIP subscriber number by a server of a VoIP carrier within the plurality of VoIP carrier servers is determined. In one example the method further includes when the VoIP subscriber number does not belong to the first VoIP carrier network, placing a second partial call to the VoIP subscriber number from a second VoIP number with a second VoIP carrier network; in response to the placing the second partial call, receiving a second signal from the second VoIP carrier network; and based on the second received signal, determining whether the VoIP subscriber number belongs to the second VoIP carrier network.

One example includes the above and further includes repeating the placing of a partial call for a predetermined number of carriers until the VoIP carrier that owns the VoIP subscriber number is found. In one embodiment, the determining whether the VoIP subscriber number belongs to the first VoIP carrier is based on the response time of the received signal.

According to another example, the determining whether the VoIP subscriber number belongs to the first VoIP carrier is based on VoIP signaling parameters within the received signal. One example further includes using the ownership determination of the VoIP subscriber number to determine a market share of a VoIP carrier. According to one example, the determined market share of the VoIP carrier may be displayed and/or stored.

Some portions of the detailed descriptions that follow are presented in terms of procedures, operations, logic blocks, processing, and other symbolic representations of operations on date bits that can be performed on computer memory. These descriptions and representations are one manner in which those skilled in the art can effectively convey the substance of their work to others skilled in the art. A procedure, computer executed operation, logic block, process, etc., is here, and generally, conceived to be a self-consistent sequence of steps or instructions leading to a desired result.

Referring now to FIG. 1, an example system 100 to measure market share of VoIP carriers is shown. The example system 100 includes a command center 180 that controls and determines the VoIP carrier that owns a VoIP subscriber number 150. The command center 180 may be coupled to a plurality of VoIP carrier servers 112, 114 and 116. The command center 180 may be also coupled to the VoIP subscriber number 150 via various VoIP networks 142, 144 and 146 of respective VoIP carriers 152, 154 and 156. In one example, the command center 180 may be coupled to a display 160 to display information and to a memory storage unit 170 to store information.

In the example of FIG. 1, the command center 180 includes a server query unit 110 to query the plurality of VoIP carrier servers (e.g., the servers 112, 114 and 116). The server query unit 110 may be coupled to a processor 120 to process information. The processor 120 may be further coupled to a partial call initiator 130 that may initiate a partial call to the VoIP subscriber number 150. As used herein, the language "partial call" refers to the preliminary steps taken to make a call but without completing the call. The partial call initiator 130 may initiate a partial call to the VoIP subscriber number 150 via the plurality of VoIP carriers 152, 154 and 156. Each of the plurality of VoIP carriers 152, 154 and 156 may include their respective VoIP subscriber number and VoIP network, e.g., VoIP subscriber numbers 132, 134 and 136 and their respective VoIP networks 142, 144 and 146. The processor 120 may further be coupled to the memory storage unit 170 to store information and to the display 160. As such, the determined market share information of various VoIP carriers may be displayed and/or stored for later retrieval.

In one example, a telephone subscriber number is selected from a Local Exchange Routing Guide (LERG) database, e.g., the telephone subscriber number 150. The LERG database may include a block of numbers that belong to a level 3 (L3). Each L3 subscriber number may be a VoIP subscriber number.

The server query unit 110 of the command center 180 sends a plurality of querying signals to the plurality of VoIP carrier servers 112, 114 and 116. Each of the servers 112, 114, and 116 may belong to a different VoIP carrier. For example, the server 112 may belong to the VoIP carrier A, the server 114 may belong to the VoIP carrier B, and the server 116 may belong to the VoIP carrier N. The plurality of querying signals is operable to query each of the servers 112, 114, and 116 for the telephone subscriber number 150 that was previously selected from the LERG database. The plurality of carrier VoIP servers may be queried in parallel or sequentially. Additionally, the plurality of the VoIP carrier servers 112, 114 and 116 may represent all or a portion of VoIP carriers in the market. The market share of VoIP carriers may be for a predetermined number of VoIP carriers. Thus, not all the VoIP carriers have to be queried but, instead, only those carriers for which a market share is to be determined In response to querying signals, the VoIP carrier servers 112, 114 and 116 may send a plurality of responses to the server query unit 110, which may further be passed on to the processor 120 for processing.

Each of the received responses may be associated with one of three possible categories; (1) the telephone subscriber number 150 is found in the queried server; (2) the telephone subscriber number 150 is not found in the queried server; and (3) the response is inconclusive. For example, the response from the VoIP carrier server may be a request to enter a password, in which case the telephone subscriber number 150 is found in that server. Alternatively, the response from the VoIP carrier server may be a signal that the telephone subscriber number 150 does not exist, in which case the telephone subscriber number 150 is not found. Alternatively, the response from the VoIP carrier server may be a signal indicating that either the password or the telephone subscriber number 150 is incorrect, in which case the response from the carrier server is inconclusive.

Accordingly, when the queried telephone subscriber number 150 is found in a queried server, the telephone subscriber number 150 is determined to belong to or owned by the VoIP carrier that corresponds to the queried server. For example, if the queried server is the server 114, which corresponds to VoIP carrier B, and the response received from server 114 indicates that the telephone subscriber number 150 is found in the server 114, the telephone subscriber number 150 is determined to be owned by or to belong to VoIP carrier B. Similarly, if the queried server is the server 112, which belongs to VoIP carrier A, and the response received from the server 112 indicates that the telephone subscriber number 150 is not found in the server 112, the telephone subscriber number 150 is determined to not belong to the VoIP carrier A and the search for the VoIP carrier that owns the telephone subscriber number 150 continues.

According to one example, when the plurality of responses from the plurality of VoIP carrier servers 112, 114 and 116 is received and the telephone subscriber number 150 is not found, or if the responses are inconclusive, the processor 120 starts a partial call process. The partial call process is initiated by the processor 120 to the telephone subscriber number 150 via the partial call initiator 130.

In one example, the partial call initiator 130 places a partial call to the telephone subscriber number 150 from a plurality of VoIP carriers, e.g., 152, 154 and 156. For example, the partial call initiator 130 places a partial call to the telephone subscriber number 150 from a VoIP subscriber number 132, that belongs to the VoIP carrier 152, via carrier network 142. The partial call initiator 130 receives a response from the telephone subscriber number 150 via the VoIP carrier 152.

Generally speaking, the parameters for an alerted response of a VoIP subscriber number to a partial call from another VoIP subscriber number that are within the same VoIP carrier network are different because, for example, handing-off the call and switching the call procedure(s) between different VoIP network carriers may not be required. For example, the SIP message type for the example VoIP subscriber number 132 to receive an alerted message that is within the VoIP carrier 152, is "Ringing" and may be "Call In Process" otherwise.

On the other hand, if it is determined that the telephone subscriber number 150 does not belong to the VoIP carrier 152, a partial call may be placed from the VoIP carrier 154 to the telephone subscriber number 150. For example, the partial call initiator 130 may place a partial call to the telephone subscriber number 150 from the VoIP subscriber number 134, which belongs to the VoIP carrier 154, via the carrier network 144. Similar to the above example, the partial call initiator 130 and/or the processor 120 may use the response from the telephone subscriber numbers 150 to determine whether the telephone subscriber number 150 belongs to the VoIP carrier 154. The foregoing process may be repeated for a predetermined number of VoIP carriers or until the ownership (e.g., the carrier to which the subscriber number belongs, the carrier within which the subscriber number resides, etc.) of telephone subscriber number 150 is determined.

The VoIP carriers 152, 154 and 156 may or may not be the same as the plurality of VoIP carriers that correspond to the plurality of servers 112, 114 and 116. Further, once the ownership of the telephone subscriber number 150 is determined, such ownership information may be stored in the memory storage unit 170. The memory storage unit 170 may be a part of the command center 180 or located in a remote location as shown. The foregoing process to determine ownership of a VoIP subscriber number may be repeated for a number of telephone subscriber numbers until a sample of statistical significance is assembled to determine VoIP market share for various VoIP carriers in an accurate manner. Further, once market share of various VoIP carriers is determined, the result may be displayed via the display 160, which may be a liquid crystal display (LCD) or the like.

Figure 2A:
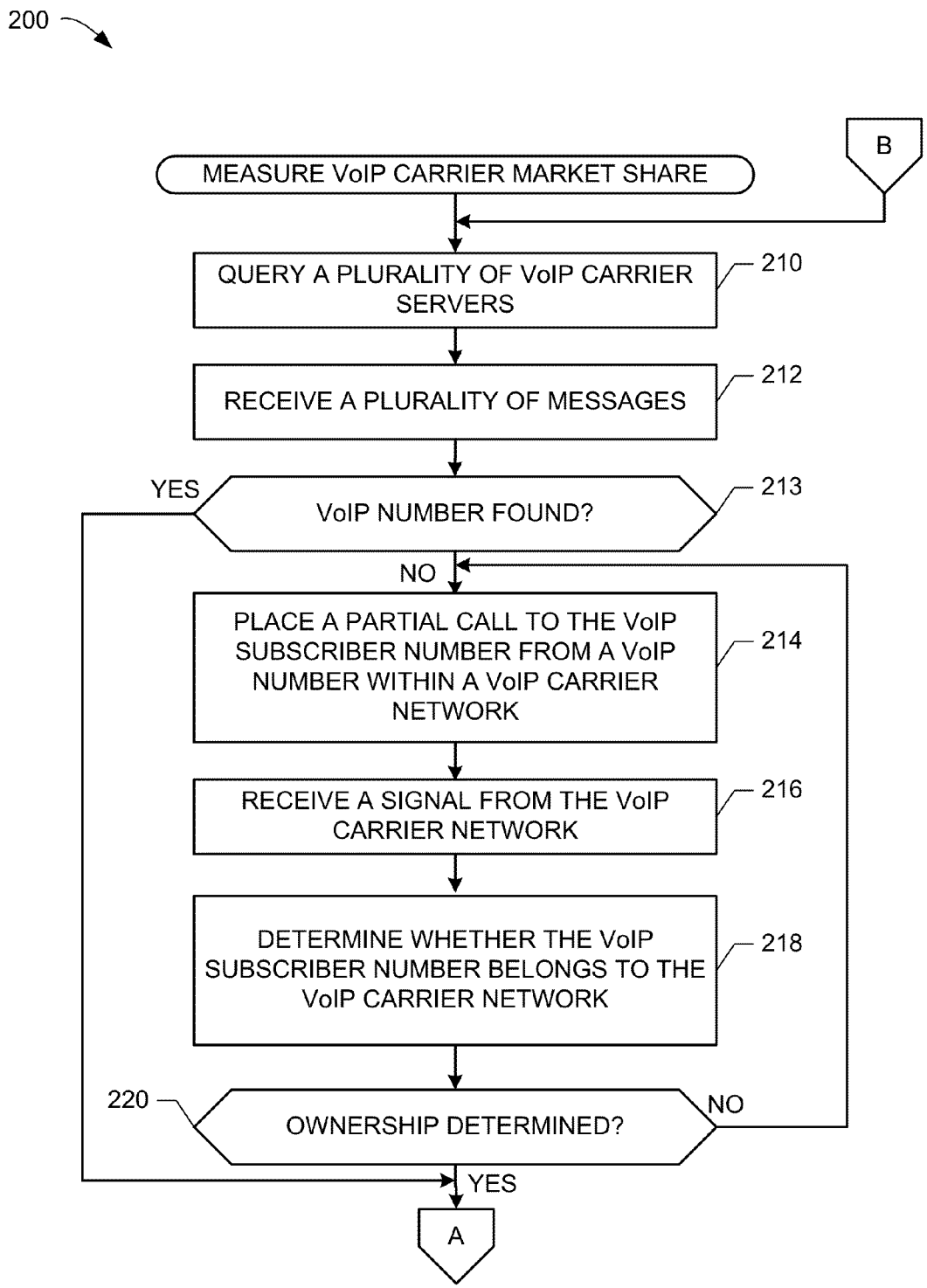
FIGS. 2A and 2B depict an example flow diagram representing a process to measure market share of VoIP carriers.
Figure 2B:
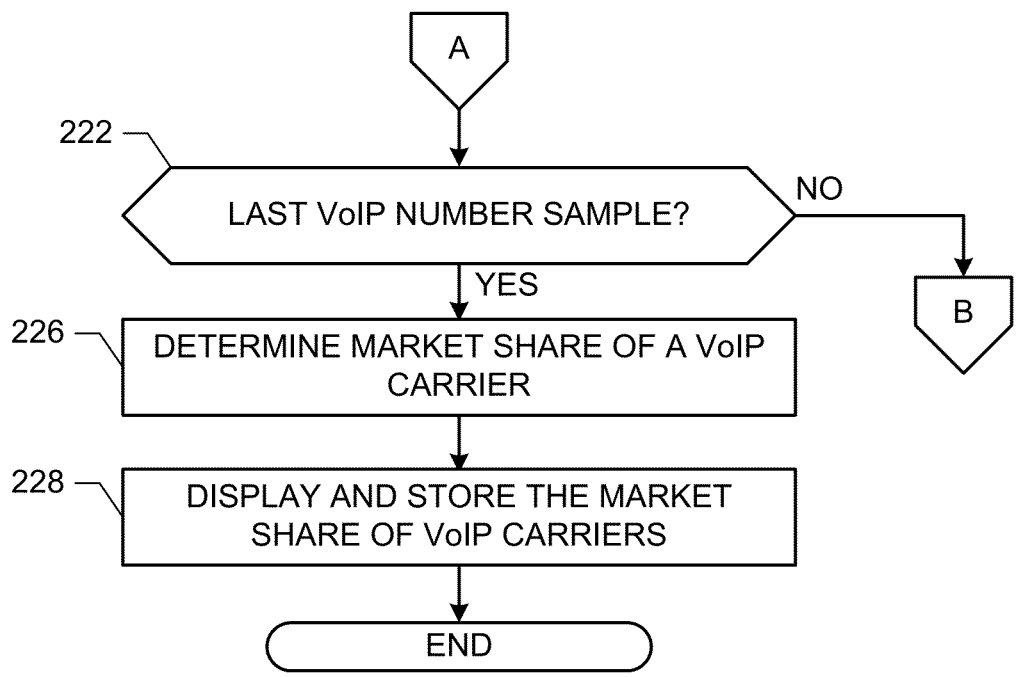

Referring now to FIGS. 2A and 2B, an example flow diagram 200 to measure market share of VoIP carriers is shown. Initially, a plurality of VoIP carrier servers is queried to determine whether a telephone subscriber number belongs to any one of the plurality of VoIP carrier servers (block 210). At block 210, the plurality of VoIP carrier servers may be queried in parallel or sequentially.

The messages or response to the queries from the plurality of carrier servers are then received (block 212). The received responses are operable to determine whether the telephone subscriber number is found within (e.g., is stored in) any one of the plurality of carrier servers. If the telephone subscriber number is found within any one of the plurality of carrier servers, the process may be terminated (block 213).

If the VoIP subscriber number is not found within any one of the plurality of carrier servers or if the response from the plurality of carrier servers is inconclusive (block 213), a first partial call is placed to the telephone subscriber number (e.g., the telephone subscriber number 150) from a VoIP subscriber number (e.g., the VoIP subscriber number 132) that is within a VoIP carrier network (e.g., the network 142). A response to the partial call from the VoIP subscriber number that is within the first VoIP carrier network is received from the VoIP subscriber number (block 216).

The signaling parameters of the received signal may be used to determine whether the telephone subscriber number is within a given VoIP carrier network (block 218). For example, based on the received response it is determined whether the telephone subscriber number is within the VoIP carrier network. In one example, the elapsed time to receive the response signal may be used to determine whether the telephone subscriber number is within the VoIP carrier network. In general, the elapsed time for a partial call of telephone subscriber numbers that are within the same VoIP carrier networks is shorter because they do not require handing off and switching between different VoIP network carriers.

Accordingly, if the telephone subscriber number is within the VoIP carrier network, it is determined to belong to the VoIP carrier network and the search for the ownership of the telephone subscriber number may be terminated (block 220). On the other hand, if it is determined that the telephone subscriber number does not belong to the first VoIP carrier (block 220), another partial call is placed to the telephone subscriber number from another VoIP subscriber number (e.g., the VoIP subscriber number 134) that is within another VoIP carrier network (e.g., the VoIP carrier network 144). The operations of blocks 214, 216, 218, and 220 may then be repeated as described above.

More generally, the operations of blocks 214-220 may be repeated until ownership of the telephone subscriber number is determined or only for a predetermined number of VoIP carriers. If the telephone subscriber number is not determined to be owned by a particular one of a plurality of VoIP carriers, the telephone subscriber number may be determined to belong to "other" VoIP subscriber carriers if the telephone subscriber number cannot be placed within any of the predetermined VoIP carrier networks.

In contrast, if the ownership of the telephone subscriber number is determined, it is determined whether the telephone subscriber number was the last telephone subscriber number within the selected sample (block 222). If the sample is not complete, control returns to block 210 to repeat the operations described above for a next telephone subscriber number (i.e., a number different than the subscriber number 150).

When it is determined that the telephone subscriber number was the last telephone subscriber number within the selected sample (block 222), the market share of VoIP carriers may be determined (block 226). The market share of VoIP carriers may be stored in a memory component. In one example, the market share of VoIP carriers may be displayed (e.g., via the display 160).

Figure 3:
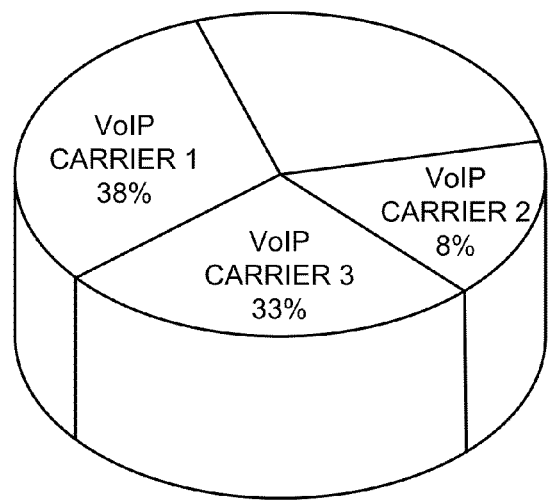
FIG. 3 depicts an example output of the measured market share of VoIP.

Referring now to FIG. 3, an example output 300 of the measured market share of VoIP carriers is shown. For example, the first VoIP carrier has 38% of the market share. The second VoIP carrier has 8% and the third VoIP carrier has 33% of the market share. It is appreciated that the output may be represented in a different format. For example, the output may be provided in a bar graph, pie chart, show a number of subscribers in a given market, a number of gross additions (e.g., new subscribers/inroads), and/or show a number of deactivated subscribers using, for example, one or more statistical models. Moreover, the output may be in audio format and/or may be transmitted to other components.

Thus, ownership of VoIP subscriber numbers may be determined. A sample size to provide statistically accurate market share information for one or more VoIP subscriber numbers is determined. Thus, market share of VoIP carriers may be determined in an automated, accurate and cost efficient manner.

Figure 4:
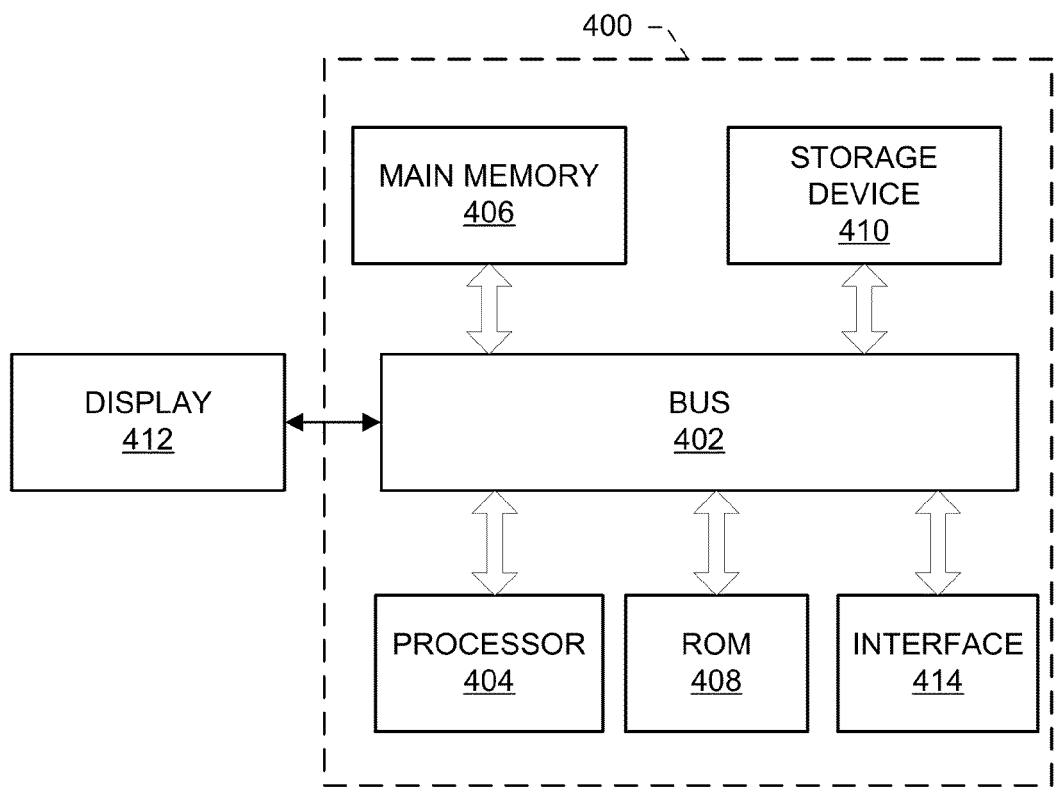
FIG. 4 illustrates a general purpose computer system that may be used to implement the example methods and apparatus described herein.

FIG. 4 is a block diagram that illustrates a computer system 400 that may be used to implement the example methods and apparatus described herein. In particular, computer system 400 may implement the process for measuring market share of VoIP carriers as shown in FIGS. 1-3 and includes a bus 402 or other communication mechanism to communicate information, and a processor 404 coupled with the bus 402 to process information.

The computer system 400 also includes a main memory 406, such as a random access memory (RAM) or other dynamic storage device, coupled to the bus 402 to store information and instructions to be executed by the processor 404. Main memory 406 may also be used to store temporary variables or other intermediate information during execution of instructions to be executed by the processor 404. The computer system 400 further includes a read only memory (ROM) 408 or other static storage device coupled to the bus 402 to store static information and instructions for the processor 404. A non-volatile storage device 410, such as a magnetic disk or optical disk, is provided and coupled to the bus 402 to store information and instructions. Instructions for measuring market share of VoIP carriers may be stored on any one of the memory components (e.g., RAM, ROM, non-volatile storage device and etc.).

The computer system 400 may be coupled via the bus 402 to an optional display 412, such as a liquid crystal display (LCD), to display information to a user. The computer system 400 also includes an interface circuit 414. The interface circuit 414 may be implemented by any type of interface standard, such as an external memory interface, serial port, general-purpose input/output, wireless network card, etc.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Common forms of computer-readable media include, for example, a floppy disk, a flexible disk, hard disk, magnetic tape, or any other magnetic medium, a CD-ROM, any other optical medium, punch cards, paper tape, any other tangible medium with patterns of holes, a RAM, a PROM, and EPROM, a FLASH-EPROM, any other memory chip or cartridge, or any other medium from which a computer can read (information, data, instructions, etc.).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

We claim:

1. A method to estimate market share of a Voice Over Internet Protocol (VoIP) carrier, comprising:
   (1) querying a plurality of VoIP carrier servers to determine the VoIP carrier server that owns a telephone subscriber number;
   (2) in response to the querying, obtaining a plurality of messages operable to determine whether the telephone subscriber number is found within any one of the plurality of VoIP carrier servers;
   (3) when the telephone subscriber number is not found within any one of the plurality of VoIP carrier servers, placing a partial call to the telephone subscriber number from a VoIP number within a selected VoIP carrier network;
   (4) in response to placing the partial call, determining whether the telephone subscriber number belongs to the selected VoIP carrier network based on a signaling parameter retrieved from the selected VoIP carrier network;
   (5) repeating (3) and (4) for another selected VoIP carrier network when the telephone subscriber number does not belong to the selected VoIP carrier network;
   (6) associating a VoIP carrier with the telephone subscriber number when the telephone subscriber number does belong to the selected VoIP carrier network;
   (7) repeating (1) to (6) when a total number of telephone subscriber numbers queried is less than a sample size; and
   (8) determining market share of a first VoIP carrier based on a first number of telephone subscriber numbers associated with the first VoIP carrier with respect to the sample size.

2. A method as defined in claim 1, further comprising:
   in response to determining the telephone subscriber number is found within any one of the plurality of VoIP carrier servers, identifying a VoIP carrier server where the telephone subscriber number is found; and
   associating the telephone subscriber number with a VoIP carrier corresponding to the identified VoIP carrier server.

3. A method as defined in claim 1, wherein determining the telephone subscriber number is not found within any one of the plurality of VoIP carrier servers includes obtaining an inconclusive message from the plurality of VoIP carrier servers.

4. A method as defined in claim 3, wherein the inconclusive message indicates at least one of an incorrect password or the telephone subscriber number is incorrect.

5. A method as defined in claim 1, wherein the signaling parameter corresponds to a period between placing the partial call and retrieving the signaling parameter.

6. A method as defined in claim 1, further comprising determining market share of a second VoIP carrier based on a second number of telephone subscriber numbers associated with the second VoIP carrier with respect to the sample size.

7. A method as defined in claim 1, wherein repeating (3) and (4) for another selected VoIP carrier network further comprises repeating the placing the partial call for a number of VoIP carriers until the telephone subscriber number is associated with a VoIP carrier.

8. A method as defined in claim 7, further comprising associating the telephone subscriber number with a group category when the telephone subscriber number is unassociated with a VoIP carrier after repeating the placing the partial call for the number of VoIP carriers.

9. An apparatus to estimate market share of a Voice Over Internet Protocol (VoIP) carrier, comprising:
  a server query unit to:
    query a plurality of VoIP carrier servers to determine the VoIP carrier server that owns a telephone subscriber number; and
    obtain a plurality of messages in response to the querying; and
  a processor to:
    determine whether the telephone subscriber number is found within any one of the plurality of VoIP carrier servers or when the received plurality of messages is at least one of inconclusive or when the telephone subscriber number is not found within any one of the plurality of VoIP carrier servers;
    cause a partial call initiator to place a partial call to the telephone subscriber number from a VoIP number within a first VoIP carrier network when the telephone subscriber number is not found within any one of the plurality of VoIP carrier servers;
    determine whether the telephone subscriber number belongs to the first VoIP carrier network based on a signaling parameter retrieved from the first VoIP carrier network in response to placing the partial call;
    cause the partial call initiator to place a partial call to the telephone subscriber number from a second VoIP number within a second VoIP carrier network when the telephone subscriber number does not belong to the first VoIP carrier network;
    associate a corresponding VoIP carrier with the telephone subscriber number when the telephone subscriber number does belong to a VoIP carrier network; and
    determine market share of a first VoIP carrier based on a first number of telephone subscriber numbers associated with the first VoIP carrier with respect to a total number of telephone subscriber numbers queried.

10. An apparatus as defined in claim 9, wherein the server query unit is to:
  identify a VoIP carrier server in response to determining the telephone subscriber number is found within any one of the plurality of VoIP carrier servers; and
  associate the telephone subscriber number with a VoIP carrier corresponding to the identified VoIP carrier server.

11. An apparatus as defined in claim 9, wherein the server query unit is to determine the telephone subscriber number is not found within any one of the plurality of VoIP carrier servers by obtaining an inconclusive message from the plurality of VoIP carrier servers, wherein the inconclusive message is indicative of at least one of an incorrect password or that the telephone subscriber number is incorrect.

12. An apparatus as defined in claim 9, wherein the signaling parameter is to correspond to a period between the partial call placement and the signaling parameter retrieval.

13. An apparatus as defined in claim 9, wherein the processor is to determine market share of a second VoIP carrier based on a second number of telephone subscriber numbers associated with the second VoIP carrier with respect to the total number of telephone subscriber numbers queried.

14. An apparatus as defined in claim 9, wherein the partial call initiator is to repeat placing the partial call for a number of VoIP carriers when the telephone subscriber number does not belong to the selected VoIP carrier network, the partial call initiator to repeat placing the partial call until the telephone subscriber number is associated with a VoIP carrier.

15. An apparatus as defined in claim 14, wherein the processor is to associate the telephone subscriber number with a group category when the telephone subscriber number is unassociated with a VoIP carrier after repeating the placing the partial call for the number of VoIP carriers.

16. A tangible machine readable storage device or storage disk comprising machine accessible instructions that, when executed, cause a machine to at least:
  (1) query a plurality of VoIP carrier servers to determine the VoIP carrier server that owns a telephone subscriber number;
  (2) in response to the querying, obtain a plurality of messages operable to determine whether the telephone subscriber number is found within any one of the plurality of VoIP carrier servers;
  (3) place a partial call to the telephone subscriber number from a VoIP number within a selected VoIP carrier network when the telephone subscriber number is not found within any one of the plurality of VoIP carrier servers;
  (4) in response to placing the partial call, determine whether the telephone subscriber number belongs to the selected VoIP carrier network based on a signaling parameter retrieved from the selected VoIP carrier network;
  (5) repeat (3) and (4) for another selected VoIP carrier network when the telephone subscriber number does not belong to the selected VoIP carrier network;
  (6) associate a VoIP carrier with the telephone subscriber number when the telephone subscriber number does belong to the selected VoIP carrier network;
  (7) repeat (1) to (6) when a total number of telephone subscriber numbers queried is less than a sample size; and
  (8) determine market share of a first VoIP carrier based on a first number of telephone subscriber numbers associated with the first VoIP carrier with respect to the sample size.

17. A tangible machine readable storage device or storage disk as defined in claim 16, wherein the instructions, when executed, cause the machine to:
  identify a VoIP carrier server where the telephone subscriber number is found when the telephone number is found within any one of the plurality of VoIP carrier servers; and
  associate the telephone subscriber number with a VoIP carrier server corresponding to the identified VoIP carrier server.

18. A tangible machine readable storage device or storage disk as defined in claim 16, wherein the signaling parameter is to correspond to an interval between the partial call placement and the signaling parameter retrieval.

19. A tangible machine readable storage device or storage disk as defined in claim 16, wherein the instructions, when executed, cause the machine to determine market share of a second VoIP carrier based on a second number of telephone subscriber numbers associated with the second VoIP carrier with respect to the sample size.

20. A tangible machine readable storage device or storage disk as defined in claim 16, wherein the instructions, when executed, cause the machine to repeat placing a partial call for a number of VoIP carriers until the telephone subscriber number is associated with a VoIP carrier when the telephone subscriber number does not belong to the selected VoIP carrier network.

21. A tangible machine readable storage device or storage disk as defined in claim 20, wherein the instructions, when executed, cause the machine to associate the telephone subscriber number with a group category when the telephone subscriber number is unassociated with a VoIP carrier after repeating the placing the partial call for the number of VoIP carriers.

* * * * *